United States Patent
Slavic et al.

(10) Patent No.: US 11,959,413 B2
(45) Date of Patent: Apr. 16, 2024

(54) EXHAUST GAS TURBOCHARGER WITH CATALYTIC CONVERTER AND HYBRID VEHICLE HAVING SUCH A TURBOCHARGER

(71) Applicant: Vitesco Technologies GmbH, Regensburg (DE)

(72) Inventors: Sasa Slavic, Heidelberg (DE); Jan Ehrhard, Wiesloch (DE)

(73) Assignee: VITESCO TECHNOLOGIES GMBH, Regensburg (DE)

(*) Notice: Subject to any disclaimer, the term of this patent is extended or adjusted under 35 U.S.C. 154(b) by 0 days.

(21) Appl. No.: 18/265,031

(22) PCT Filed: Nov. 24, 2021

(86) PCT No.: PCT/EP2021/082845
§ 371 (c)(1),
(2) Date: Jun. 2, 2023

(87) PCT Pub. No.: WO2022/117413
PCT Pub. Date: Jun. 9, 2022

(65) Prior Publication Data
US 2024/0026811 A1    Jan. 25, 2024

(30) Foreign Application Priority Data

Dec. 3, 2020  (DE) ...................... 10 2020 215 307.8

(51) Int. Cl.
*F01N 3/28* (2006.01)
*F02B 37/02* (2006.01)

(52) U.S. Cl.
CPC .......... *F02B 37/025* (2013.01); *F01N 3/2882* (2013.01)

(58) Field of Classification Search
CPC ............................. F01N 3/2882; F02B 37/025
(Continued)

(56) References Cited

U.S. PATENT DOCUMENTS 4,122,673 A * 10/1978 Leins ...................... F02B 39/14
417/407
2007/0062190 A1  3/2007 Melchior
(Continued)

FOREIGN PATENT DOCUMENTS

DE        2348866        4/1975
DE        4335153        9/1995
(Continued)

OTHER PUBLICATIONS

Office Action of corresponding German Patent Application No. 10 2020 215 307.8.
(Continued)

*Primary Examiner* — Jorge L Leon, Jr.
(74) *Attorney, Agent, or Firm* — Cozen O'Connor

(57) ABSTRACT

An exhaust gas turbocharger with an integrated catalyst substrate block and a hybrid vehicle having such a turbocharger are described. The exhaust gas turbocharger has a turbine housing, a turbine wheel and upstream ahead of the turbine wheel a hollow body-shaped catalyst substrate block, which is integrated in the exhaust gas ring duct of the turbine housing of the exhaust gas turbocharger. As a result of the upstream disposal of the turbine wheel and the integration in the exhaust gas ring duct of the turbine housing, particularly good emission values of an associated internal combustion engine can be achieved with a compact construction mode.

7 Claims, 3 Drawing Sheets

(58) Field of Classification Search
USPC .................................. 60/280, 299, 605.1
See application file for complete search history.

(56) References Cited

U.S. PATENT DOCUMENTS

| | | | | |
|---|---|---|---|---|
| 2011/0179770 | A1* | 7/2011 | Schmuck-Soldan | F02B 37/18 |
| | | | | 60/299 |
| 2012/0312011 | A1* | 12/2012 | Romblom | F01D 9/026 |
| | | | | 60/605.1 |
| 2013/0014503 | A1 | 1/2013 | Romblom | |
| 2014/0202140 | A1* | 7/2014 | Murphy | F01N 13/1838 |
| | | | | 60/299 |
| 2015/0000273 | A1* | 1/2015 | Di Martino | F01N 3/2882 |
| | | | | 60/605.1 |
| 2019/0078467 | A1* | 3/2019 | Jakobcic | F02B 37/00 |

FOREIGN PATENT DOCUMENTS

| | | | |
|---|---|---|---|
| DE | 102008034215 | | 1/2010 |
| DE | 102014003390 | | 9/2015 |
| DE | 102017201468 | | 8/2018 |
| EP | 2818640 | | 12/2014 |
| WO | WO-2009118471 A1 * | 10/2009 | ........... F01N 13/107 |

OTHER PUBLICATIONS

Rolf Brück et al. "The Ring Catalyst—an Innovative, Ultracompact Solution of EU7" Vitesco Technologies Emitec GmbH, Hauptstr, 128, 53797, Lohmar, Germany, pp. 1-16.

\* cited by examiner

EXHAUST GAS TURBOCHARGER WITH CATALYTIC CONVERTER AND HYBRID VEHICLE HAVING SUCH A TURBOCHARGER

CROSS REFERENCE TO RELATED APPLICATIONS

This is a U.S. national stage of Application No. PCT/EP2021/082845 filed Nov. 24, 2021. Priority is claimed on German Application No. DE 10 2020 215 307.8 filed Dec. 3, 2020 the content of which is incorporated herein by reference.

BACKGROUND OF THE INVENTION

1. Field of the Invention

The present disclosure relates to an exhaust gas turbocharger for an internal combustion engine with a compressor and a turbine, the turbine having a turbine housing with an exhaust gas feed port, an exhaust gas discharge port, an exhaust gas ring duct, and a turbine wheel disposed in the turbine housing.

2. Description of the Related Art

Catalytic converters in an exhaust system are installed as close as possible to the engine so that they reach their operating temperature quickly and are effective even at low operating temperatures (e.g. in city traffic). The decisive factor here is the light-off temperature of the catalytic converter, i.e. the temperature at which the catalytic converter begins to break down pollutants.

In general, this also applies to vehicles that are equipped with an internal combustion engine charged by an exhaust gas turbocharger. In order to achieve a rapid start-up of the catalytic converter and a particularly good catalytic conversion rate, it would be advantageous here to arrange the catalytic converter upstream of the turbine of the exhaust gas turbocharger, as close as possible to the engine outlet, in terms of the exhaust gas mass flow. This applies in particular when the internal combustion engine is used in conjunction with an electric motor drive, for example in a so-called hybrid vehicle. Due to the frequent downtime intervals of the internal combustion engine, the catalytic converter cools down again and again and thus an increased proportion of operating phases below the light-off temperature of the catalytic converter and thus increased, unacceptable pollutant emissions arise. In this context, in particular, it is therefore desirable to shorten the heating-up time of the catalytic converter by disposing it as close as possible to the engine in terms of the flow path of the exhaust gas mass flow.

Due to the additional volume and heat capacity, however, a catalytic converter disposed upstream of the exhaust gas turbocharger has negative effects on the performance of the internal combustion engine, particularly in transient load change situations. In addition, a catalytic converter disposed upstream of the turbine of the exhaust gas turbocharger, which would be advantageous in terms of cold start behavior and emissions, leads to pressure losses and thermal losses, which result in a deterioration in response behavior in transient operating ranges and behavior in the lower torque or speed range. Therefore, in conventional motor vehicles, in order to prevent effects compromising the operating behavior, a disposal of a catalytic converter upstream of a turbocharger has been avoided and the catalytic converter has therefore been provided downstream of the turbocharger. To the best of our knowledge, pre-turbocharger catalytic converters, i.e. catalytic converters located upstream of the turbine, have only been used hitherto in stationary applications. In motor vehicles with internal combustion engines or combustion engines, the catalytic converter has hitherto usually been disposed downstream of the turbocharger, i.e. negative effects on the cold start behavior and the conversion rates have been accepted in order to avoid adverse effects on the operating behavior.

SUMMARY OF THE INVENTION

The present disclosure is based on providing an exhaust gas turbocharger of the type described at the outset, which causes particularly low emissions from an associated internal combustion engine, and of specifying a hybrid vehicle which is distinguished by particularly low pollutant emissions.

According to one aspect of the invention, this object is achieved in an exhaust gas turbocharger and a hybrid vehicle of the type specified in that a catalyst substrate block is integrated into the exhaust gas ring duct of the turbine housing of the exhaust gas turbocharger upstream of the turbine wheel of the exhaust gas turbocharger.

In contrast to the prior art mentioned above, the teaching according to one aspect of the invention thus provides for a catalytic converter to be integrated upstream of the turbine wheel of the exhaust gas turbocharger in the turbine housing, as claimed in the independent claims.

The exhaust gas turbocharger according to one aspect of the invention for an internal combustion engine has a compressor and a turbine through which an exhaust gas mass flow can flow, which are disposed conjointly along a turbocharger axis, the turbine having a turbine housing and a turbine wheel disposed in the turbine housing. The turbine housing has an exhaust gas feed port, an exhaust gas discharge port, which extends axially in the direction of the turbocharger axis, and an exhaust gas ring duct that encompasses the turbine wheel and the exhaust gas discharge port in terms of the turbocharger axis. In terms of the exhaust gas mass flow, a hollow catalyst substrate block is integrated upstream of the turbine wheel and downstream of the exhaust gas feed port in the exhaust gas ring duct in the turbine housing in such a manner that it fills the exhaust gas ring duct so as to encircle the circumference of the latter and conjointly with the exhaust gas ring duct encompasses the exhaust gas discharge port.

This ensures that the entire exhaust gas mass flow introduced into the exhaust gas ring duct upstream of the catalyst substrate block must flow through the catalyst substrate block before it hits the turbine wheel. The exhaust gas ring duct and the catalyst substrate block extend in the axial direction at least over a part of the exhaust gas discharge port, the catalyst substrate block filling the exhaust gas ring duct so as to encircle the circumference but not necessarily over its entire axial extent. The axial extent of the catalyst substrate block can be dimensioned in such a way that the length of the flow path through the catalyst substrate block is dimensioned such that a high conversion rate of the pollutants in the exhaust gas mass flow is ensured.

The hollow body design of the catalyst substrate block comprises, for example, the shape of a straight hollow cylinder or else, for example, a conical hollow-cylinder shape, in other words a hollow truncated cone, or other hollow body shapes that are suitable for installation in an exhaust gas ring duct of a turbine housing.

The hybrid vehicle according to one aspect of the invention has an internal combustion engine and an electric motor and is characterized in that the internal combustion engine has an exhaust gas turbocharger according to one aspect of the invention, as described above and below.

The exhaust gas turbocharger and hybrid vehicle according to one aspect of the invention has a number of advantages. The catalytic converter is integrated into the turbine housing, so that a corresponding amount of space can be saved. Furthermore, the full catalytic converter volume can be disposed upstream of the turbine of the exhaust gas turbocharger, i.e. a second catalytic converter downstream of the exhaust gas turbocharger can be dispensed with. A special configuration of the turbine housing for the inflow of the turbine wheel can also be dispensed with, since such a design can be transferred to the catalytic converter, which ensures that there is a corresponding inflow to the turbine. The arrangement of the catalytic converter according to the invention, integrated into the turbine housing, enables the direct connection of the catalytic converter conjointly with the exhaust gas turbocharger and the exhaust gas outlet manifold of the internal combustion engine, thus enabling the length of the flow path between the internal combustion engine, catalytic converter and turbocharger to be minimized and the energy losses on the flow path to be kept to a minimum. This enables the catalytic converter to be heated up quickly to its light-off temperature and improves the response behavior of the exhaust gas turbocharger with high power output.

In the aforementioned embodiment of the exhaust gas turbocharger, the catalyst substrate block can be configured in the form of a so-called ring catalyst, which has the shape of a hollow cylinder or hollow truncated cone that is inserted into the exhaust gas ring duct. This is in contrast to conventional solid cylindrical or conical catalyst substrate blocks. The ring shape or hollow cylindrical shape or hollow truncated cone shape has particular advantages here, since the catalyst substrate block can thereby be completely integrated into the exhaust gas ring duct of the turbine housing encompassing the turbine wheel and the exhaust gas discharge port. This enables a particularly compact construction of the combination of exhaust gas turbocharger and catalytic converter.

According to one aspect of the invention the catalytic converter inlet is disposed very close to the outlet of the internal combustion engine and the catalytic converter outlet is disposed very close to the turbine wheel. This can be implemented in a compact manner in particular when the catalyst substrate block is designed as a ring catalyst.

BRIEF DESCRIPTION OF THE DRAWINGS

The invention and advantageous embodiments of the invention are presented and explained in detail below with reference to the figures of the drawing. In the drawing.

DETAILED DESCRIPTION OF THE PRESENTLY PREFERRED EMBODIMENTS

Figure 1:
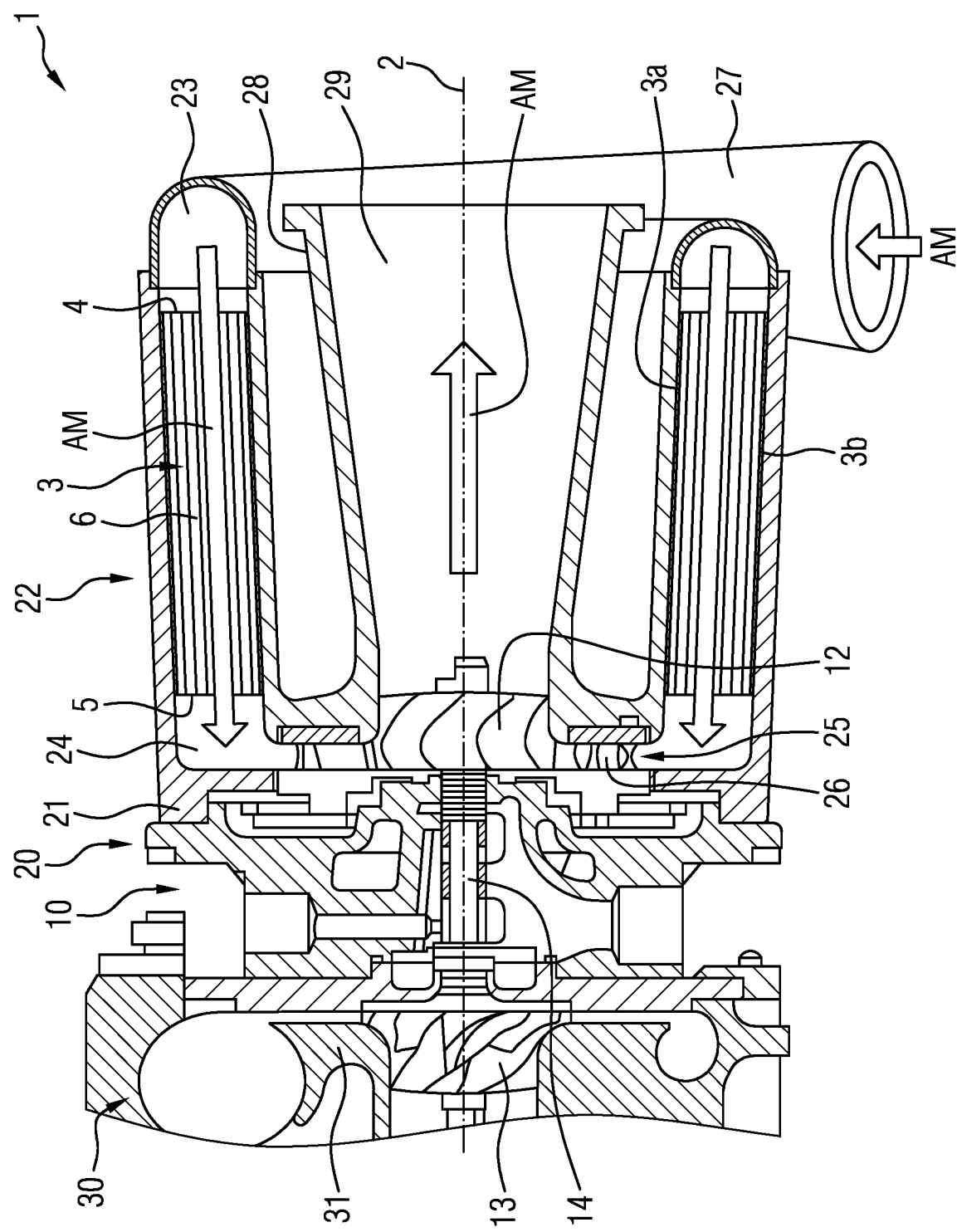
FIG. 1 is a schematic, simplified illustration of an exhaust gas turbocharger with a catalyst substrate block integrated into the turbine housing, in half section.

The exhaust gas turbocharger 1 shown here has a compressor 30 with a compressor housing 31, a bearing module 10, and a turbine 20 with a turbine housing 21 through which an exhaust gas mass flow AM can flow, which are disposed conjointly next to one another along a turbocharger axis 2 (from left to right in the illustration).

A compressor wheel 13 is disposed in the compressor housing 31, and a turbine wheel 12 is disposed in the turbine housing 21. The compressor wheel 13 and the turbine wheel 12 are disposed on the opposite ends of a rotor shaft 14 in a rotationally fixed manner, conjointly with the latter forming the turbocharger rotor, which is mounted in the bearing module 10 so as to co-rotate with the rotor shaft 14 about the turbocharger axis 2, which at the same time represents the rotor axis of rotation and defines the axial direction of the exhaust gas turbocharger 1.

The turbine housing 21 has an exhaust gas feed port 27, an exhaust gas discharge port 28, which extends axially in the direction of the turbocharger axis 2, and an exhaust gas ring duct 22 that encompasses the turbine wheel 12 and the exhaust gas discharge port 28 in terms of the turbocharger axis 2. The exhaust gas ring duct 22 extends in the axial direction across the exhaust gas discharge port 28 and encloses the latter over its external circumference.

In terms of the exhaust gas mass flow AM, which is shown in FIG. 1 by solid arrows, upstream ahead of the turbine wheel 12 and downstream of the exhaust gas feed port 27, a hollow body-shaped catalyst substrate block 3, which here is configured as a hollow cylinder and can also be referred to as a ring catalyst, in the exhaust gas ring duct 22 is integrated in the turbine housing 21 in such a manner that it fills the exhaust gas ring duct 22 so as to encircle the circumference of the latter and conjointly with the exhaust gas ring duct 22 encompass the exhaust gas discharge port 28.

Figure 2:
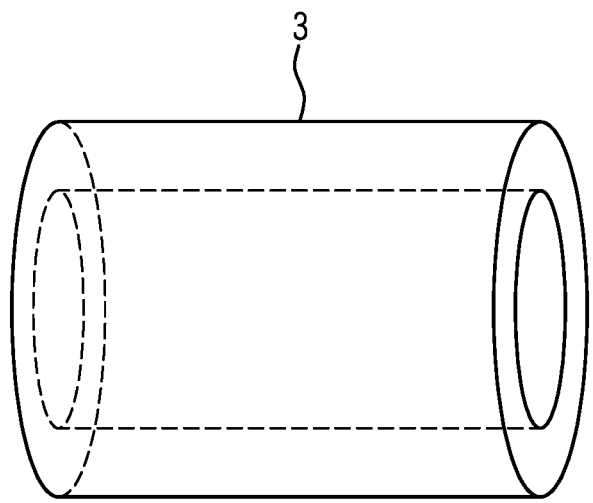
FIGS. 2 and 3 are catalyst substrate blocks in a simplified illustration.

FIG. 2 shows a potential shape of a catalyst substrate block 3 in the form of a hollow body, specifically a catalyst substrate block 3 configured as a straight hollow cylinder.

Figure 3:
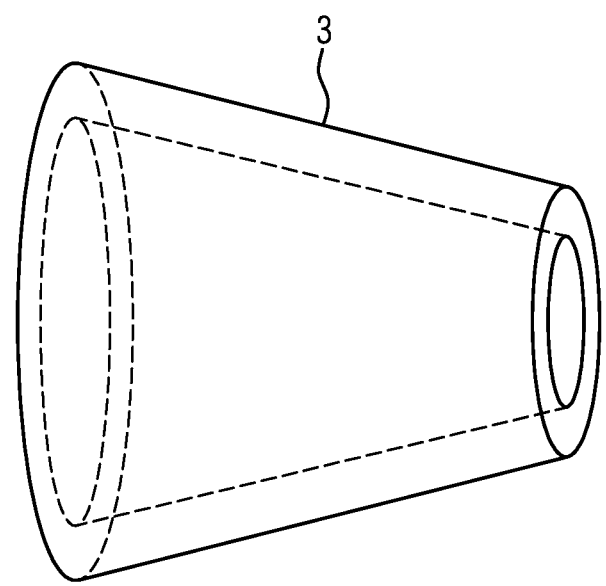

FIG. 3 shows a further potential shape of a catalyst substrate block 3 in the form of a hollow body, specifically a catalyst substrate block 3 configured as a hollow truncated cone.

According to one embodiment of the exhaust gas turbocharger 1, an inlet ring duct 23 is formed in the exhaust gas ring duct 22 upstream of the catalyst substrate block 3, to which the exhaust gas feed port 27 for introducing the exhaust gas mass flow AM is connected. In this embodiment, the exhaust gas mass flow AM is introduced into the exhaust gas ring duct 22 from a tangential direction via the inlet ring duct 23 and distributed over the circumference of the inlet side of the catalyst substrate block and introduced into the catalyst substrate block. The inlet ring duct 23 can be configured, for example, as a spiral duct with a cross section that tapers in the direction of flow of the exhaust gas mass flow AM, as shown in FIG. 1. This corresponds approximately to the geometry of an exhaust gas volute that is customary in turbine housings, by which the exhaust gas is guided to the catalytic converter inlet side 4 in a spiral path. This advantageously enables a uniform distribution of the exhaust gas mass flow AM over the circumference of the catalytic converter inlet side 4 and a uniform flow through the catalyst substrate block.

Furthermore, in this embodiment, an annular induction channel 24 is configured in the exhaust gas ring duct 22 downstream of the catalyst substrate block 3, so as to transfer the exhaust gas mass flow AM to the turbine wheel 12. This advantageously enables a uniform distribution of the exhaust gas mass flow AM over the circumference of the turbine wheel 12 and an introduction of the exhaust gas mass flow AM distributed over the circumference into the exhaust gas ring gap 25 for transfer to the turbine wheel 12.

Figure 4:
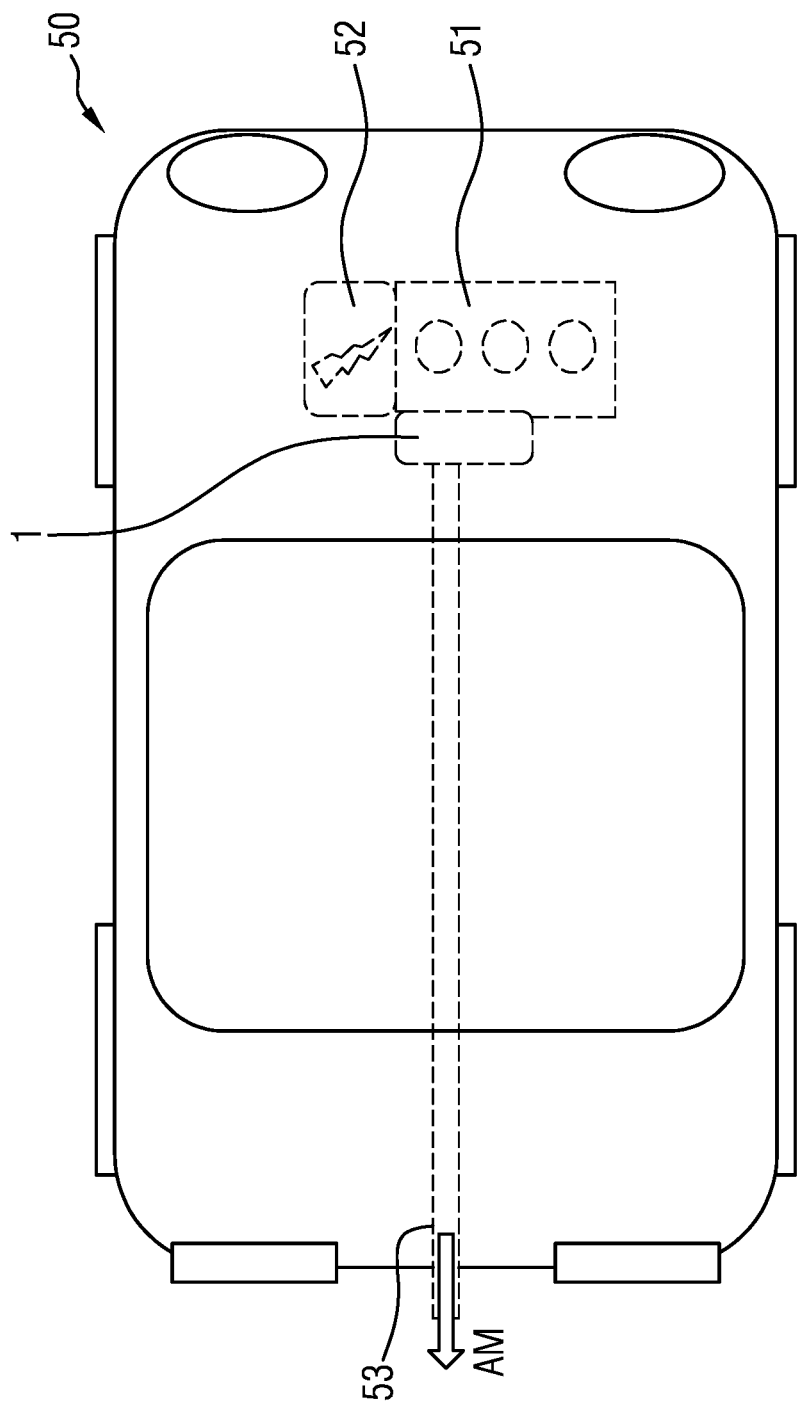
FIG. 4 is a highly simplified illustration of a hybrid vehicle with an internal combustion engine, an electric motor, and an exhaust gas turbocharger.

The direction of flow and the flow path of the exhaust gas mass flow AM through the turbine housing 21 and the catalyst substrate block 3 is indicated by solid arrows and runs in the sequence in which they are mentioned through the exhaust gas feed port 27 into the inlet ring duct 23, and further through the catalyst substrate block 3 into the annular induction channel 24 and from here through the exhaust gas ring gap 25 onto the turbine wheel 12, and further through the flow duct 29 of the exhaust gas discharge port 28, for example, into an exhaust system of a motor vehicle, for example a hybrid vehicle 50, as shown in FIG. 4.

After leaving the catalyst substrate block 3 on its catalytic converter outlet side 5, the cleaned exhaust gas mass flow AM accumulates in the annular induction channel 24 and then passes through the circumferential exhaust gas ring gap 25, which represents a narrowing of the cross section in a predominantly radial direction toward the turbine wheel 12, and flows from there onto the turbine wheel 12 and drives this. The exhaust gas is discharged from the turbine wheel 12 in the axial direction via the exhaust gas discharge port 28, which has a flow duct 29 which is configured, for example, as an outlet diffuser with a cross section that widens conically in the direction of flow. A connecting flange at the end of the exhaust gas discharge port 28 is used for attachment to the exhaust system of the associated internal combustion engine.

According to one aspect, the exhaust gas turbocharger 1, as also shown by way of example in FIG. 1, has a catalyst substrate block 3 with a catalytic converter inlet side 4 lying upstream in the exhaust gas mass flow AM and a catalytic converter outlet side 5 lying downstream, continuous flow ducts 6 running between the catalytic converter inlet side 4 and the catalytic converter outlet side 5 being provided in the catalyst substrate block 3, the profile of which has an axial component and a component in the circumferential direction of the hollow body-shaped catalyst substrate block 3 in terms of the turbocharger axis 2. This results in a more or less spiral profile of the flow ducts 6, as well as an inlet direction running obliquely to the catalytic converter inlet side 4 and an outlet direction running obliquely to the catalytic converter outlet side 5 for the exhaust gas mass flow.

The flow ducts 6 on the catalytic converter inlet side 4 are preferably inclined in the circumferential direction counter to the flow direction of the exhaust gas mass flow AM, i.e. counter to the spiral profile of the inlet ring duct 23, which reduces the required deflection and associated flow losses of the exhaust gas mass flow when it enters the catalyst substrate block 3. While maintaining this inclination, the flow ducts 6 run spirally through the catalyst substrate block 3 and impart to the exhaust gas mass flow AM on the catalytic converter outlet side 5 a flow direction that has a more or less large directional component in the circumferential direction of the annular induction channel 24, into the exhaust gas ring gap 25 and onto the turbine wheel 12. This arrangement of the flow ducts 6 on the one hand advantageously reduces the flow losses of the exhaust gas mass flow and increases the power output of the turbine wheel 12, and on the other hand the length of the flow path through the catalyst substrate block 3 is thereby increased, so that a high conversion rate of the pollutants in the exhaust gas mass flow AM is ensured. In other words, in this embodiment, the structure of the catalyst substrate block 3 is used to optimize the inflow and the power yield of the turbine and the conversion rate of the pollutants.

In one aspect of the exhaust gas turbocharger 1, the hollow body-shaped catalyst substrate block 3 per se, as also shown in FIG. 1, can have an internal tube 3a and an external tube 3b enclosing the catalyst substrate block 3 on its outside, which are designed, for example, as straight cylinder tubes or as conical tubes, depending on the embodiment of the catalyst substrate block. The internal tube 3a delimits the catalyst substrate block 3 toward its inner cavity and the external tube comprises the catalyst substrate block 3 on the external side of the latter. The internal tube 3a and the external tube 3b can be mechanically fixedly connected to the catalyst substrate block 3 and advantageously serve both as mechanical protection and to stabilize the catalyst substrate block 3.

In one aspect of the exhaust gas turbocharger 1, an exhaust gas ring gap 25 is formed downstream of the catalyst substrate block 3 in the transition between the exhaust gas ring duct 22 and the turbine wheel 12, in which a variable flow control apparatus 26 is disposed. Such a flow control apparatus 26 of a turbine is also known as "variable turbine geometry" (VTG) and is used to control the exhaust gas mass flow AM in the direction of the turbine wheel 12 and to change the flow cross section of the exhaust gas ring gap 25 for the advantageous adjustment of the performance of the turbocharger in transient operating ranges of the internal combustion engine.

The exhaust gas turbocharger is characterized in that the exhaust gas discharge port 28 of the turbine housing 21, as also illustrated in FIG. 1, is configured as an outlet diffuser with a flow duct 29 widening in the flow direction of the exhaust gas mass flow AM. The exhaust gas ring duct 22 of the turbine housing and thus the catalyst substrate block integrated therein comprise the exhaust gas discharge port and thus the outlet diffuser. The exhaust gas mass flow expands in the outlet diffuser and the exhaust gas back pressure acting on the turbine wheel outlet is advantageously reduced.

As can be seen from FIG. 1, the features of the aforementioned aspects can also be implemented in a combination of several of the features or in their entirety in an exhaust gas turbocharger.

The integration of the catalyst substrate block 3 carried out according to one aspect of the invention, in particular in the form of a ring catalyst, in the turbine housing 21 of the exhaust gas turbocharger 1 has a number of advantages. This includes, above all, the close proximity of the catalytic converter to the engine's exhaust valves, so that the catalytic converter responds more quickly and improved cold start and restart emissions are achieved. Furthermore, compared to conventional catalytic converters, a higher pressure is achieved within the catalyst substrate block 3 and a good homogeneous temperature distribution is achieved within the catalyst substrate block 3, which leads to a high conversion rate for the pollutants in the exhaust gas mass flow. Furthermore, a reduced thermal load on the turbine of the exhaust gas turbocharger is achieved. In addition, a simple and cost-reduced construction mode is achieved.

Illustrated symbolically in FIG. 4 is a hybrid vehicle 50 according to one aspect of the invention. This has an internal combustion engine 51 and an electric motor 52 and is characterized in that the internal combustion engine 51 has an inventive exhaust gas turbocharger 1 according to one of the embodiments described above. An exhaust system 53 of the hybrid vehicle 50 is connected to the exhaust gas turbocharger 1 for discharging the exhaust gas mass flow AM from which pollutants have been removed.

A combination of a conventional combustion engine, in particular an internal combustion engine, and an electric motor is used in such hybrid vehicles. Typically, the electric drive is responsible for low loads and short distances, while the combustion engine is mainly used for higher loads and long distances or operates as a so-called "range extender" to charge the battery. This means that the operating range of the internal combustion engine in hybrid vehicles is comparatively small compared to vehicles with pure combustion engines. This means that the transient response and the torque behavior in the lower range of the combustion engine are of less importance for hybrid drives, but on the other hand the restart ability and the emissions become more important.

Since therefore the requirements in terms of the transient response and the torque behavior in the lower range for the internal combustion engine are lower in hybrid drives, it is proposed to use the solution according to one aspect of the invention of the catalytic converter arrangement upstream of the exhaust gas turbocharger in such hybrid vehicles in order to reduce the corresponding emissions and achieve particularly good results. The solution according to one aspect of the invention is therefore particularly favorable for such hybrid vehicles, since different requirements are placed on hybrid vehicles in comparison to vehicles with internal combustion engines. The solution according to the invention can therefore be implemented particularly well here.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An exhaust gas turbocharger for an internal combustion engine, the exhaust gas turbocharger comprising:
    a compressor;
    a turbine coaxially coupled to the compressor along a turbocharger axis, the turbine including a turbine housing and a turbine wheel rotatably arranged in the turbine housing, the turbine housing comprising:
        an exhaust gas supply port configured to receive an exhaust gas mass flow,
        an exhaust gas discharge port extending coaxially downstream of the turbine wheel along the turbocharger axis, and
        a hollow exhaust gas ring duct configured to convey the exhaust gas mass flow from the exhaust gas supply port to the turbine wheel, the exhaust gas ring duct arranged so as to concentrically encompass the turbine wheel and the exhaust gas discharge port; and
    a hollow catalyst substrate block integrated into the turbine housing so as to fill the xaust gas ring duct upstream of the turbine wheel and downstream of the exhaust gas supply port.

2. The exhaust gas turbocharger as claimed in claim 1, wherein the exhaust gas ring duct includes:
    an inlet ring duct formed upstream of the catalyst substrate block, the inlet ring duct configured to receive the exhaust gas mass flow from the exhaust gas supply port; and
    an annular induction channel formed downstream of the catalyst substrate block, the annular induction channel configured to transfer the exhaust gas mass flow to the turbine wheel.

3. The exhaust gas turbocharger as claimed in claim 1, wherein the catalyst substrate block includes:
    a catalytic converter inlet side and a catalytic converter outlet side, and
    continuous flow ducts running between the catalytic converter inlet side and the catalytic converter outlet side, the continuous flow ducts each including an axial component and a circumferential component with respect to the turbocharger axis.

4. The exhaust gas turbocharger as claimed in claim 1, wherein the catalyst substrate block is delimited by an internal tube along an inner cavity of the catalyst substrate block and an external tube along an outer surface of the catalyst substrate block, and
    wherein the internal tube and the external tube configured to stabilize the catalyst substrate block within the exhaust gas ring duct.

5. The exhaust gas turbocharger as claimed in claim 1, wherein the turbine housing further comprises:
    an exhaust gas ring gap arranged in a transition between the exhaust gas ring duct and the turbine wheel, and
    a variable flow control apparatus disposed in the exhaust gas ring gap.

6. The exhaust gas turbocharger as claimed in claim 1, wherein the exhaust gas discharge port is an outlet diffuser with a flow duct that widens in a downstream direction of the exhaust gas mass flow.

7. A hybrid vehicle comprising:
    an electric motor; and
    an internal combustion engine including the exhaust gas turbocharger as claimed in claim 1.

* * * * *